United States Patent [19]
Wemyss

[11] 4,188,726
[45] Feb. 19, 1980

[54] LEVEL-DETERMINING DEVICE

[76] Inventor: William A. Wemyss, W. Hyde House, London Rd., Great Missenden, Bucks, England

[21] Appl. No.: 927,339

[22] Filed: Jul. 24, 1978

[30] Foreign Application Priority Data

Aug. 1, 1977 [GB] United Kingdom ............... 32114/77

[51] Int. Cl.² ........................ G01B 3/11; G01F 23/04
[52] U.S. Cl. ...................................... 33/126.6; 73/309; 73/321
[58] Field of Search ..................... 73/290 R, 296, 309, 73/321; 33/126.6

[56] References Cited

U.S. PATENT DOCUMENTS

| | | | |
|---|---|---|---|
| 1,729,770 | 10/1929 | Eynon | 73/309 |
| 2,575,110 | 11/1951 | Korr | 73/296 X |
| 2,614,578 | 10/1952 | Stickney | 73/309 X |
| 3,401,563 | 9/1968 | Lonnon | 73/321 X |
| 3,500,546 | 3/1970 | Pilcher | 73/321 X |

*Primary Examiner*—Daniel M. Yasich
*Attorney, Agent, or Firm*—Blanchard, Flynn, Thiel, Boutell & Tanis

[57] ABSTRACT

A level determining-device wherein a chain is suspended from a mechanism which is adapted to raise and lower the chain. Means are provided for sensing the weight of a part of the chain hanging freely from the mechanism, whereby the length of the freely hanging part, and hence a desired level, can be determined.

11 Claims, 10 Drawing Figures

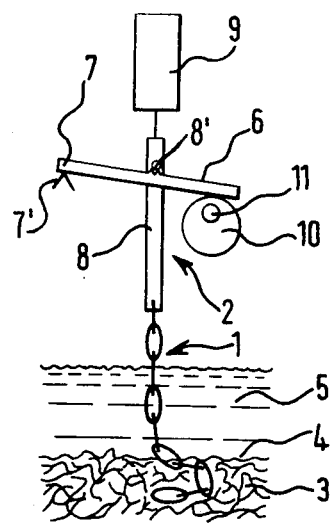
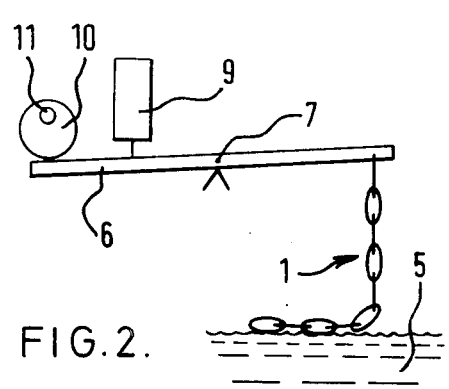
FIG.1.  FIG.2.
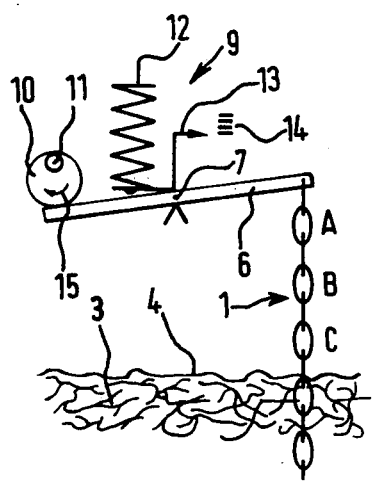
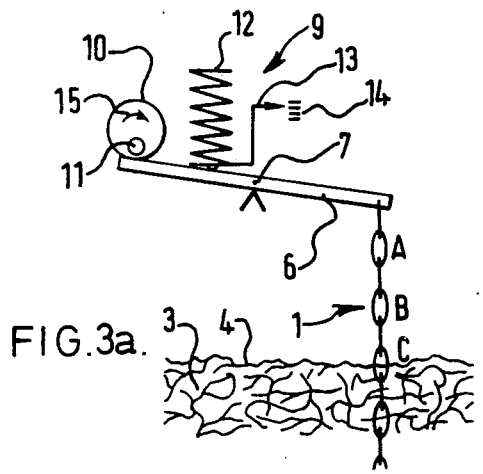
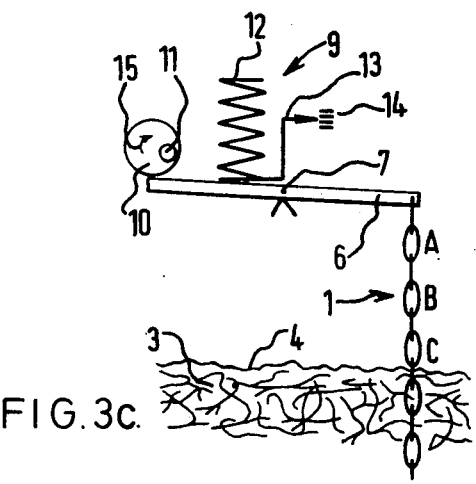
FIG.3a.
FIG.3b.
FIG.3c.

LEVEL-DETERMINING DEVICE

BACKGROUND OF THE INVENTION

This invention relates to level-determining devices.

SUMMARY OF THE INVENTION

A level-determining device comprising a chain suspended at an upper end thereof from a mechanism which is adapted to raise and lower said upper end of the chain, and means for sensing the weight of part of the chain hanging freely from said mechanism and hence the length of said freely hanging part of the chain and hence the desired level, characterised in that said mechanism comprises means engageable with a movable support, the upper end of the chain being connected to said support, said means being adapted and arranged to act upon the support periodically and to raise the support (with the upper end of the chain) to a predetermined level and then to allow the support to lower until the combined weight of the support and said freely hanging part of the chain is borne by a device for sensing said combined weight.

Preferably said support is a pivoted beam.
Preferably said cam is a rotating cam.
Preferably said chain is a chain of links, all the links being of the same length, and the cam is adapted to reciprocate the upper end of the chain (by acting upon the support) a distance of between one and two chain links.

BRIEF DESCRIPTION OF THE DRAWINGS

The invention will be further described by way of example, with reference to the accompanying drawings, in which:

FIG. 1 is a schematic diagram of a first preferred device;

FIG. 2 is a schematic diagram of a second preferred device;

FIGS. 3a, 3b, and 3c are schematic diagrams of a third preferred device illustrating its operation;

DETAILED DESCRIPTION OF PREFERRED EMBODIMENTS

Figure 4:
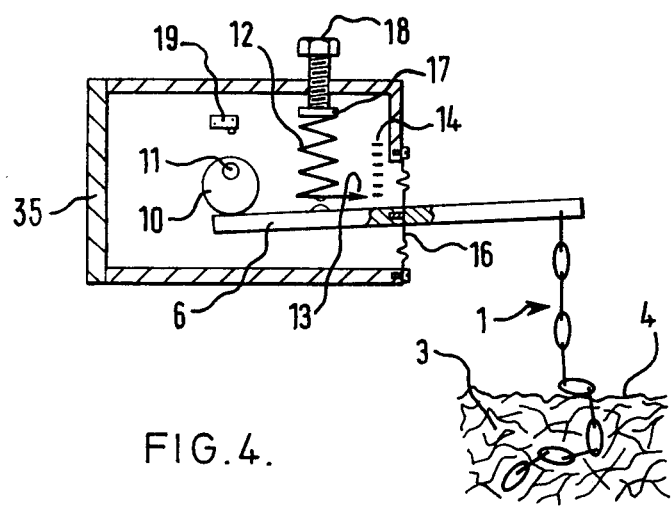
FIG. 4 is a schematic diagram of a fourth preferred device.

Like reference numerals in the drawings refer to like parts.

The level-determining device shown in FIG. 1 comprises a chain 1 suspended at its upper end from a mechanism 2 for raising and lowering the chain. The lower end of the chain 1 is embedded in material 3 and a link of the chain rests on the upper surface 4, of the material whose level or height is to be determined. The material 3 is shown covered by a layer 5 of a liquid. The chain is heavier than the liquid.

The mechanism 2 comprises a lever 6 which is pivoted at 7 by support means diagrammatically shown at 7', which lever has a middle portion pivotally connected at 8' to a vertical chain-support member 8. A lower end of the member 8 suspends the chain 1 and an upper end of the member 8 is connected to weight sensing means 9. A cam 10 is eccentrically on and rotatable mounted with a shaft 11 and is arranged so as to contact the end of the lever 6 distant from the pivot 7 during rotation with the shaft 11 to thereby move the lever by an amount sufficient to raise the chain 1 by at least the length of one of its links.

In use, the shaft 11 and the cam 10 are rotated so as to initially move the lever 6 counterclockwise in FIG. 1 about its pivot 7 due to the eccentricity of the cam 10 relative to the rotatable shaft 11. This movement of lever 6 is transmitted to the member 8 which lifts the chain 1, pulling part of the lower end of the chain out of the material 3. Further rotation of the shaft 11 and the eccentric cam 10 allows the lever 6 to rotate clockwise in FIG. 1 about the pivot 7. This movement is transmitted to the member 8 which lowers the chain 1 so that a part of its lower end (at least one link) which is free of the material 3 rests on the upper surface 4. The weight sensing means 9 then senses the weight of the freely hanging part of the chain 1, from which weight the length of the freely hanging part of the chain, and hence the level or height of the surface 4, can be determined.

Instead of a cam for moving the support lever, the support lever could be actuated by a rotary crank attached thereto. This arrangement would be equally suitable.

The level-sensing device shown in FIG. 2 is similar to that of FIG. 1, but differs in that the upper end of the chain 1 is directly connected to one end of the lever 6 and the cam 10 is arranged above the other end of the lever 6 with the pivot 7 arranged between the two ends of the lever. Further, the weight sensing means 9 is connected to the lever 6 between the pivot 7 and the end on which the cam 10 acts.

Operation of the device of FIG. 2 is similar to that of FIG. 1. The chain 1 is shown resting on the upper surface of the liquid 5 whose level is to be determined.

The level-sensing device shown in FIGS. 3a, 3b, and 3c is similar to that of FIG. 2. However, in this device, the weight sensing means 9 comprises a spring 12, whose upper end is fixed and whose lower end is arranged to be moved by the lever 6, and pointer means 13 connected to the lower end of the spring 12 and arranged to cooperate with a scale 14 to provide an indication of the weight of the free hanging part of the chain 1. An arrow 15 indicates the direction of rotation of the cam 10 and the shaft 11.

FIG. 3a shows the device at the start of a measuring cycle with a link C of the chain 1 partially embedded in the material 3. As the cam 10 and the shaft 11 are rotated in the direction of the arrow 15, the cam presses down on the adjacent end of the lever 6, which is rotated counterclockwise about the pivot 7. The chain 1, including links A, B and C, is thus raised so that the link C is pulled clear of the material 3, as in FIG. 3b.

Further rotation of the cam 10 and the shaft 11 allows the lever 6 to rotate clockwise about the pivot 7, thus lowering the chain 1 so that the link C rests on the surface 4 whose level is to be determined. The clockwise motion of the lever 6 is resisted by the spring 12, which is compressed until the resulting force thereof balances the weight of the freely hanging part of the chain 1 and the support. The compression of the spring 12 is indicated by the position of the pointer 13 with respect to the scale 14, which may be calibrated to show the level of the surface 4 directly.

The level-sensing device shown in FIG. 4 is similar to that of FIGS. 3a, 3b, and 3c. However, it is housed in a sealed container 35 having a diaphragm 16 which also replaces the pivot 7 and acts as a pivot and seal for the lever 6. The upper end of the spring 12 abuts against a stop 17 whose position is vertically adjustable by means of a sensor adjuster 18. The spring can thus be adjusted, for instance, to allow different chains to be used. A microswitch 19 is provided and is arranged to be actuated by the cam 10 when the "bottom" of the cam lobe is adjacent the end of the lever to indicate that a reading may be taken or to cause the reading to be taken automatically.

Figure 5A:
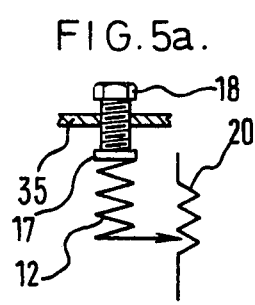
FIGS. 5a, 5b, and 5c schematically show modifications of the devices of FIGS. 3a, 3b, 3c and 4.

FIG. 5a shows a modification which may be used with the devices of FIGS. 3a, 3b, 3c, and 4. The pointer 13 and the scale 14 are replaced by a variable resistance or a potentiometer 20 whose resistance or tapping point is caused to vary with the compression of the spring 12. In the case of a variable resistance 20, it may be arranged that the highest value of the resistance during a cycle provides a measure of the level, in which case the position of the cam 10 is sensed so as to allow a measurement to take place after the cam 10 has moved the lever so as to lift the chain 1 and ensure that at least one link rests on the surface 4. The pick-off could optionally be an LVDT, inductive or capacitive.

Figure 5B:
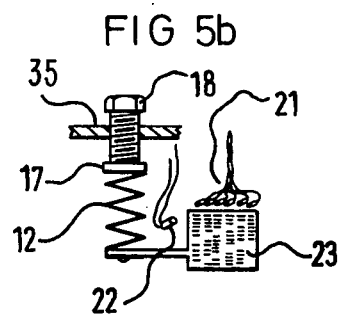

FIG. 5b shows another modification, in which the pointer 13 and the scale 14 are replaced by a plurality of photosensors 21, a light source 22, and an opaque screen 23 therebetween, connected to the lower end of the spring 12 and having formed therein perforations representing, for instance, a gray code.

An advantage of using a gray code is that only one "bit" changes for the smallest measureable discrete movement of the screen 23. With this arrangement, the position of the bottom of the spring 12 can be measured in absolute terms, the highest count after a cycle representing the weight, and hence length, of the freely hanging part of the chain 1. However, a plurality of sensors are required.

Figure 5C:
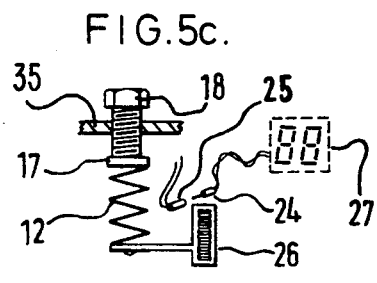

FIG. 5c shows yet another modification, in which the pointer 13 and the scale 14 are replaced by a photocell and detector 24 and light source 25, and a mask 26 therebetween connected to the lower end of the spring and having a plurality of bars formed, for instance, by photoetching. The output of the photocell and detector 24 is connected to a standard pulse counter 27 for counting pulses corresponding to interruption of a light beam from the light source 25 to the photocell by the bars on the mask 26. The counter is arranged to count the pulses during upward movement of the bottom of the spring 12, the total count representing the weight of the freely hanging part of the chain 1. This arrangement can sense the position of the cam 10 on a time basis because a motor driving the cam 10 may by a synchronous motor and the movement will be regulated. Unequal spacing of the bars on the mask 26 can give zero information.

Figure 6:
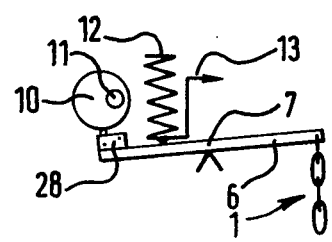
FIG. 6 is a schematic diagram of a fifth preferred device.

In the level-sensing device shown in FIG. 6, a microswitch 28 is provided on the lever 6 at the point where the lever is contacted by the cam 10. The microswitch 28 may be used to prevent measurements from being taken when the cam 10 is in contact with the lever 6, i.e. while the microswitch 28 is operated. This arrangement may be used to prevent inaccurate measurements being taken, for instance, during movement of material in a hopper during filling or emptying thereof, which movement may cause sufficient drag on the chain 1 to cause the lever 6 to be rotated so as to come into contact with the cam 11.

The preferred devices may be used to sense the levels of solid materials, for instance, coal or cornflakes. They may also be used to sense the levels of fluids, such as water. For this latter purpose, the chain 1 may be made of a plastics of lower density than water. For fluids of lower density, an expanded plastics such as structural foam may be used. The weight of the freely hanging part of the chain is proportional to the length thereof above the fluid surface, since the fluid will support the remainder of the chain. Under these conditions, it is not necessary for the lever 6 to be reciprocated by the cam 10 since the lower end of the chain does not become embedded.

The preferred devices may be used where there is an interface between two liquids of different densities. The chain is chosen to float on the liquid of higher density and, by sensing the level of the lower density with another device, the interface can be measured. Also, the level of a solid, such as sand, in a varying height of water may be measured.

With reciprocating motion of the lever 6, the chain is kept agitated, thus reducing the chances of tangling of the chain 1 on the surface of a liquid and the device may be used for many different duties.

Preferred devices may be small and hermetically sealed, and can be arranged to produce a signal for remote reading. In a preferred form, a housing with a single seal may be made by injection molding, thus providing a low cost device capable of use in bad environmental conditions.

I claim:

1. A level determining device comprising an elongated flexible chain, pivotally-mounted support means connected to the upper end of said chain for suspending the chain into contact with a material whose level is to be determined, means operable to pivotally move said support means back and forth to correspondingly raise and lower the chain with respect to level changes of said material, and weight sensing means arranged to counterbalance the pivotal movement of the support means as said chain is lowered by said support means until a freely hanging part of the chain is in contact with said material at the level to be determined, said weight sensing means providing a reading or output representative on the weight and hence the length of said freely hanging part so that said level can be determined from said weight reading.

2. A device according to claim 1, wherein said support means is a pivoted beam and said chain is suspended from one end of said beam.

3. A device according to claim 2, wherein the lower end of said chain is adapted to be embedded in the material of which the level is being determined, whereby upward displacement of said beam causes limited upward lifting of the chain so that at least a part thereof is withdrawn from the material, following which lowering of the beam and accompanied lowering of said chain causes said withdrawn part to rest on the surface of said material, whereby the weight of the hanging part of said chain thus determines the length thereof so as to permit the level of said material to be determined.

4. A device according to claim 2, wherein said operable means is a cam rotatably mounted and constructed to periodically pivot said beam by operatively engaging the other end of the beam during rotation thereof.

5. A device as claimed in claim 4 wherein said chain is a series of connected links, all the links being of the same length, said cam being adapted to vertically reciprocate the upper end of the chain a distance of between one and two chain links.

6. A device as claimed in claim 4 wherein said weight sensing means comprises spring means one end of which is arranged to be held in a fixed position, the other end being arranged to be moved by said beam, and detector means connected to said other end and arranged to detect the compression or extension of said spring means thereby providing an indication of the weight of the freely hanging part of said chain.

7. A device as claimed in claim 6 wherein said detector means comprises pointer means connected to said other end and arranged to cooperate with a scale to provide an indication of said weight of the freely hanging part of the chain.

8. A device as claimed in claim 6 wherein said detector means comprises electrical resistance means having a tapping point which is caused to vary with the compression of said spring means thereby providing a measure of said compression and consequently providing an indication of the weight of said freely hanging part of the chain.

9. A device as claimed in claim 6 wherein said detector means comprises a plurality of photo sensors, a light source and an opaque or reflective screen positioned therebetween, said opaque or reflective screen having formed therein perforations representing a predetermined code, whereby the position of the end of the spring means can be measured in absolute terms, the highest count after a cycle representing the weight of said freely hanging part of the chain.

10. A device as claimed in claim 6 wherein said detector means comprises a photocell, detector and light source, with a mask positioned therebetween and connected to the lower end of said spring means, said mask having a plurality of bars formed thereon by photoetching, the output of said photocell and detector being connected to a standard pulse counter for counting pulses corresponding to the interruption of a light beam from said light source to said photocell during upward movement of the bottom of said spring means, said total count representing the weight of said freely hanging part of the chain.

11. A device according to claim 4, including a sealed housing, said beam being pivotally supported within said housing and projecting through a diaphragm of said housing, said diaphragm forming a pivot for said beam during lowering and raising movements of said chain.

* * * * *

UNITED STATES PATENT AND TRADEMARK OFFICE
CERTIFICATE OF CORRECTION

PATENT NO. : 4 188 726
DATED : February 19, 1980
INVENTOR(S) : William A. Wemyss It is certified that error appears in the above—identified patent and that said Letters Patent are hereby corrected as shown below:

Column 4, line 43; change "on" to ---of---.

Signed and Sealed this

Tenth Day of June 1980

[SEAL]

Attest:

SIDNEY A. DIAMOND

Attesting Officer

Commissioner of Patents and Trademarks